(12) United States Patent
Nachtman et al.

(10) Patent No.: US 11,292,935 B2
(45) Date of Patent: *Apr. 5, 2022

(54) COMPOSITION FOR ENCAPSULATION AND CONTAINMENT OF SUBSTANCES

(71) Applicant: Tru BLOC LLC, Willoughby, OH (US)

(72) Inventors: Thomas J. Nachtman, Willoughby, OH (US); John A. Kelton, Willoughby, OH (US)

(73) Assignee: Tru BLOC LLC, Willoughby, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/000,864

(22) Filed: Aug. 24, 2020

(65) Prior Publication Data

US 2020/0385603 A1 Dec. 10, 2020

Related U.S. Application Data

(63) Continuation of application No. 16/100,367, filed on Aug. 10, 2018, now Pat. No. 10,752,800.

(Continued)

(51) Int. Cl.
| | | |
|---|---|---|
| *C09D 133/10* | (2006.01) | |
| *C09D 7/63* | (2018.01) | |
| *C09D 7/65* | (2018.01) | |
| *C08L 83/12* | (2006.01) | |
| *C09D 5/20* | (2006.01) | |

(Continued)

(52) U.S. Cl.
CPC ............ *C09D 133/10* (2013.01); *C08L 83/12* (2013.01); *C09D 5/021* (2013.01); *C09D 5/20* (2013.01); *C09D 7/63* (2018.01); *C09D 7/65* (2018.01); *C08G 77/46* (2013.01); *C08K 5/0091* (2013.01); *C08K 5/053* (2013.01); *C08K 5/07* (2013.01); *C08K 5/101* (2013.01); *C08K 5/17* (2013.01);

(Continued)

(58) Field of Classification Search
USPC ............................ 588/6; 427/154; 524/388
See application file for complete search history.

(56) References Cited

U.S. PATENT DOCUMENTS

| | | | | |
|---|---|---|---|---|
| 3,236,458 A | * | 2/1966 | Ramis | ................... B05B 7/0012 |
| | | | | 239/338 |
| 4,519,545 A | * | 5/1985 | Kuminecz | ................. B05B 1/28 |
| | | | | 239/288 |

(Continued)

FOREIGN PATENT DOCUMENTS

WO WO 2017/088104 * 6/2017 ................ C08F 2/24

OTHER PUBLICATIONS

Angus Technical Data Sheet: AMP(R) (2-Amino-2-Methyl-1-Propanol Solution), 2 Pages, Published May 2015. (Year: 2015).*

(Continued)

*Primary Examiner* — Fred M Teskin
(74) *Attorney, Agent, or Firm* — MacMillan, Sobanski & Todd, LLC

(57) ABSTRACT

Provided is a latex-based composition capable of being applied to a surface to form a strippable coating on the surface that can encapsulate substances. The composition may include a latex polymer component and an anti-freeze component, and have a viscosity of less than or equal to about 90 cP. The composition may be delivered as an aerosol spray or a misting agent.

24 Claims, 12 Drawing Sheets

Related U.S. Application Data

(60) Provisional application No. 62/547,480, filed on Aug. 18, 2017, provisional application No. 62/547,483, filed on Aug. 18, 2017.

(51) Int. Cl.

| | | |
|---|---|---|
| *C09D 5/02* | (2006.01) | |
| *C08K 5/053* | (2006.01) | |
| *C08L 83/04* | (2006.01) | |
| *C08K 5/07* | (2006.01) | |
| *C08K 5/17* | (2006.01) | |
| *C08K 5/101* | (2006.01) | |
| *C08K 5/36* | (2006.01) | |
| *C08K 5/521* | (2006.01) | |
| *C08K 5/00* | (2006.01) | |
| *C08G 77/46* | (2006.01) | |

(52) U.S. Cl.
CPC ............... *C08K 5/36* (2013.01); *C08K 5/521* (2013.01); *C08L 83/04* (2013.01)

(56) References Cited

U.S. PATENT DOCUMENTS

| 5,878,355 | A * | 3/1999 | Berg ................ B01J 13/0095 |
| | | | 427/212 |
| 8,952,081 | B2 * | 2/2015 | Annis ................ C09D 17/001 |
| | | | 523/122 |
| 9,388,323 | B2 * | 7/2016 | Zong ................ C09D 133/02 |
| 10,752,800 | B2 * | 8/2020 | Nachtman ............ C08L 83/12 |

OTHER PUBLICATIONS

Swindell, "Sodium Omadine Chemical Fact Sheet Jul. 1985", http://pmep.cce.cornell.edu/profiles/miscpesticides/methylchloride-xanthangum/sodium-omadine/anti-prof-sod-omadine.html, Jul. 16, 1985 (Jul. 16, 1985); section 1, section 2. (Year: 1985).*

Lecithin Applications, American Lecithin Company, www.americanlecithin.com/leci_appfood.html, pp. 1-9, Copyright 2000-2003. (Year: 2003).*

* cited by examiner

COMPOSITION FOR ENCAPSULATION AND CONTAINMENT OF SUBSTANCES

RELATED APPLICATIONS

This is a continuation application of U.S. application Ser. No. 16/100,367, filed under 35 U.S.C. § 111(a) on Aug. 10, 2018, now issued as U.S. Pat. No. 10,752,800; which claims priority to U.S. Provisional Application No. 62/547,480, filed under 35 U.S.C. § 111(b) on Aug. 18, 2017, as well as U.S. Provisional Application No. 62/547,483, filed under 35 U.S.C. § 111(b) on Aug. 18, 2017. The entire disclosures of all the aforementioned applications are expressly incorporated herein by reference for all purposes.

BACKGROUND OF THE INVENTION

Inhalation of potentially lethal or incapacitating aerosols presents a real and present danger to numerous individuals. Whether deliberately released in a terroristic venue or through a passive incident, the resulting circumstances can be catastrophic. Inhaling aerosols containing lethal opioids, biological agents, or irradiated particles can cause irreparable harm or death.

Illicit opioids can commonly be fine powders which when disturbed, move through the air as dust-like particles. This lethal dust is easily inhaled. First interactors, such as law enforcement personnel, are often subjected to a serious risk of inadvertently inhaling harmful substances, such as fentanyl, when working to secure a contaminated area. These unintentional fentanyl overdoses can be life-threatening events. Similar unintentional overdoses may occur with other harmful substances, such as methamphetamine.

Law enforcement personnel are at risk of secondary exposure through inhalation of life-threatening aerosols. Secondary exposure can occur during drug raids and normal law enforcement activities. Lethal aerosols include but are not limited to fentanyl, carfentanil, heroin, anthrax, ricin, unknown powders, and mass casualty agents. Law enforcement personnel are at increased risk of secondary exposure to potentially lethal opioids through inhalation, for instance when administering opioid reversing drugs to persons who have overdosed on an opioid drug. To administer the opioid reversing drug, law enforcement officers are in close proximity to the overdosed patient, placing them at risk of secondary exposure to the same opioids.

Fire and emergency medical personnel in the field such as paramedics, medical transport personnel, and emergency medical technicians are at increased risk of secondary exposure to potentially lethal opioids through inhalation, such as when administering opioid reversing drugs to persons who have overdosed on an opioid drug. To administer the opioid reversing drug, these personnel are in close proximity to the overdosed patient, placing them at risk of secondary exposure to the same opioids.

The Opioid Commission Report states that United States Postal Service, FedEx, UPS, and additional packaging handling couriers unwittingly transport and deliver packages containing lethal opioids and possible mass casualty agents. These packages may not be commercially sealed and may be at risk of leaking their contents. Package carriers are at risk of secondary exposure to potentially lethal opioids and mass casualty agents through inhalation.

The Centers for Disease Control has identified fentanyl and other opioids as potential mass casualty agents, for instance when disposed in a commercial aircraft. Airline staff and passengers are at risk of direct exposure to these opioids and other mass casualty agents through inhalation of aerosols.

Transportation security agents are at risk of secondary exposure to potentially deadly opiods, mass casualty agents, and harmful unknown white powders through inhalation of aerosols of these substances.

Potentially deadly opioids are found in schools throughout the United States and abroad daily. School faculty members, nurses, and resource officers are placed at risk of secondary exposure to these potentially deadly opioids by inhalation.

Border patrol agents routinely search vehicles such as automobiles, trucks, boats, and planes. Fentanyl and other deadly opioids are transported into the United States utilizing these vehicles. Border patrol agents are at risk of secondary exposure when searching these vehicles through inhalation of opioid aerosols.

Emergency room nurses and staff are at risk of secondary exposure to potentially deadly opioids when treating overdosed patients through inhalation of opioid aerosols. Due to the close proximity of their work with these patients, there is an increased risk of harmful or deadly secondary exposure.

Corrections officers are at increased risk of secondary exposure to opioid aerosols in the course of their duties at correctional facilities. When processing prisoners, opioid aerosols may be transferred from the prisoner to the corrections officers and inhaled, causing potentially deadly secondary exposure.

Mass transit facilities and conduits have been identified as a risk area in the event of a deadly or harmful aerosol dispersal. These facilities include subways, trains, planes, buses, passenger ships, and metro transportation systems. Whether by accident or design, harmful aerosols including opioids or mass casualty agents may be inhaled by a large quantity of people, causing exposure which may lead to incapacitation or death.

Military personnel have diverse missions within the country and abroad, which may place them at risk of secondary exposure to harmful or deadly aerosols. These aerosols are commonly inhaled, causing symptoms which may lead to death or incapacitation.

Due to the ongoing threat of terrorism utilizing nuclear or biological components, military and special operations personnel are at risk of exposure to lethal or incapacitating agents in the form of aerosols. Aerosols of a biological nature or irradiated aerosols place military personnel and special operations teams at risk of exposure.

Protective services including Secret Service, sheriff departments, FBI, CIA, U.S. Marshals, Capitol police, and commercial protective services are aware of the use of white powders to incapacitate or kill political figures and persons of notoriety. These white powders containing lethal components may be inhaled as aerosols, exposing the individual to a deadly mix. The target and protective services personnel are at risk of exposure to these debilitating agents through inhalation.

To prevent exposure, there is a need in the art for a way to contain or encapsulate potentially deadly aerosols and powders. There is a need in the art for methods and devices which prevent the inhalation and cross contamination of, or secondary exposure to, harmful substances. It would be especially advantageous to provide a way of preventing accidental inhalation of these harmful substances by individuals who work in positions that may require exposure to them.

SUMMARY OF THE INVENTION

Provided is a composition comprising a latex polymer component and an anti-freeze component, where the composition has a viscosity of less than or equal to about 90 cP and is capable of being applied to a surface to create a strippable coating on the surface. In certain embodiments, the composition is in the form of an aerosol spray or a misting agent.

Provided is a composition comprising a latex polymer component, an antimicrobial agent, a coalescing aid, an anti-freeze component, a defoamer, a dispersant, a surfactant, and a homogenization aid, where the composition has a viscosity of less than or equal to about 90 cP. In certain embodiments, the composition is capable of being stripped from a non-porous surface by peeling following application to the surface. In certain embodiments, the composition is in the form of an aerosol spray or a misting agent. In certain embodiments, the composition is packaged in a container configured to deliver the composition as an aerosol spray or a misting agent.

In certain embodiments, the composition has a boiling point of about 212° F., a freezing point of about 27° F., a specific gravity of about 1.0-1.2, a density of about 9.25 lbs/gal, and a pH of from about 6.5 to about 8.0.

In certain embodiments, the latex polymer component comprises a butyl acrylate polymer. In certain embodiments, the latex polymer component comprises a butyl acrylate/vinyl acetate copolymer. In certain embodiments, the coalescing aid comprises 2,2,4-trimethyl-1,3-pentanediol monoisobutyrate. In certain embodiments, the anti-freeze component comprises propylene glycol. In certain embodiments, the antimicrobial agent comprises sodium omadine. In certain embodiments, the latex polymer component comprises UCAR 3560. In certain embodiments, the defoamer comprises a polyether siloxane copolymer containing fumed silica. In certain embodiments, the surfactant is a silicone surfactant. In certain embodiments, the dispersant comprises 2-amino-2-methyl-1-propanol. In certain embodiments, the homogenization aid comprises lecithin.

In certain embodiments, the composition further includes one or more dyes. In particular embodiments, the composition includes orange dye in an amount ranging from about 0.01 wt % to about 0.9 wt %. The orange dye may alert a user to the presence of a potentially contained substance.

In certain embodiments, the composition further includes water.

In certain embodiments, the composition further comprises acetaldehyde in an amount of less than 0.02 wt %.

Further provided is a composition comprising water in an amount ranging from about 35 wt % to about 40 wt %, butyl acrylate polymer in an amount of less than 51 wt %, poly(oxy-1,2-ethaanediyl)-alpha-(4-nonylphenyl)-omega-hydroxyl-vinyl acetate in an amount of less than 2 wt %, vinyl acetate in an amount ranging from about 0.03 wt % to about 0.06 wt %, acetaldehyde in an amount of less than 0.02 wt %, propylene glycol in an amount ranging from about 2 wt % to about 3 wt %, and oxygenated hydrocarbons in an amount ranging from about 2 wt % to about 3 wt %. In certain embodiments, the composition comprises other additives in an amount ranging from about 1 wt % to about 5 wt %.

Further provided is a composition comprising a latex emulsion and an anti-freeze component, where the composition has a viscosity of less than or equal to about 90 cP and is capable of delivery via aerosol spray to create a strippable coating.

Further provided is a composition comprising a defoamer in an amount of about 0.043 wt %, an antimicrobial agent in an amount of about 0.072 wt %; a latex polymer component in an amount of about 83.3 wt %, a dispersant in an amount of about 0.669 wt %, a coalescing aid in an amount of about 3.11 wt %, a dye in an amount of about 0.191 wt %, a surfactant in an amount of about 0.477 wt %, an anti-freeze component in an amount of about 3.49 wt %, a homogenization aid in an amount of about 0.477 wt %, and water in an amount of about 8.14 wt %. In certain embodiments, the defoamer comprises 901 W, the antimicrobial agent comprises sodium omadine, the latex comprises UCAR 3560, the dispersant comprises AMP, the coalescing aid comprises UCAR IBT Filmer, the dye comprises orange, the surfactant comprises DC 193, the anti-freeze component comprises propylene glycol, and the homogenization aid comprises lecithin.

Further provided is a composition comprising a latex-based material having a viscosity of less than or equal to about 90 cP and capable of being delivered by aerosol spray to create a strippable coating.

Further provided is an aerosol system for applying a coating comprising a canister, a bladder within the canister that houses a latex-based composition comprising an anti-freeze component and having a viscosity of less than or equal to about 90 cP, and a propellant within the canister, where the propellant is completely separated from the composition. In certain embodiments, the propellant comprises compressed air or nitrogen. In certain embodiments, the canister holds about 1.5 oz.

In certain embodiments, the aerosol system comprises an actuator with a head having an orifice and being rotatable within a base member between a first position and a second position. In particular embodiments, in the first position, a lip of the base member blocks the orifice, and in the second position the orifice is not blocked by the lip.

Further provided is a method for preventing exposure to a substance, the method comprising spraying a surface having a substance thereon with a composition herein to form a strippable coating or containment film on the surface, and peeling the strippable coating off the surface to remove the substance from the surface. In certain embodiments, the substance comprises a narcotic, an amphetamine, a radioactive material, an explosive material, a flammable material, or a biological agent.

Further provided is a method for decontaminating a surface, the method comprising spraying an area with a latex-based aerosol spray composition to form a strippable coating on a surface in the area, and peeling the strippable coating off of the surface to decontaminate the surface.

Further provided is a method of neutralizing a harmful substance, the method comprising spraying a harmful substance with a latex-based composition comprising a neutralizing agent, where the latex-based composition forms a strippable coating that absorbs the harmful substance, and peeling the strippable coating to contain and neutralize the harmful substance. In certain embodiments, the harmful substance comprises a narcotic, an amphetamine, a radioactive material, an explosive material, a flammable material, or a biological agent.

BRIEF DESCRIPTION OF THE DRAWINGS

The patent or application file may contain one or more drawings executed in color and/or one or more photographs.

Copies of this patent or patent application publication with color drawing(s) and/or photograph(s) will be provided by the U.S. Patent and Trademark Office upon request and payment of the necessary fees.

FIG. 2D shows a cross-section taken at line A-A of FIG. 2C. FIG. 2F shows a cross-section taken at line C-C of FIG. 2E.

DETAILED DESCRIPTION

Figure 1A:
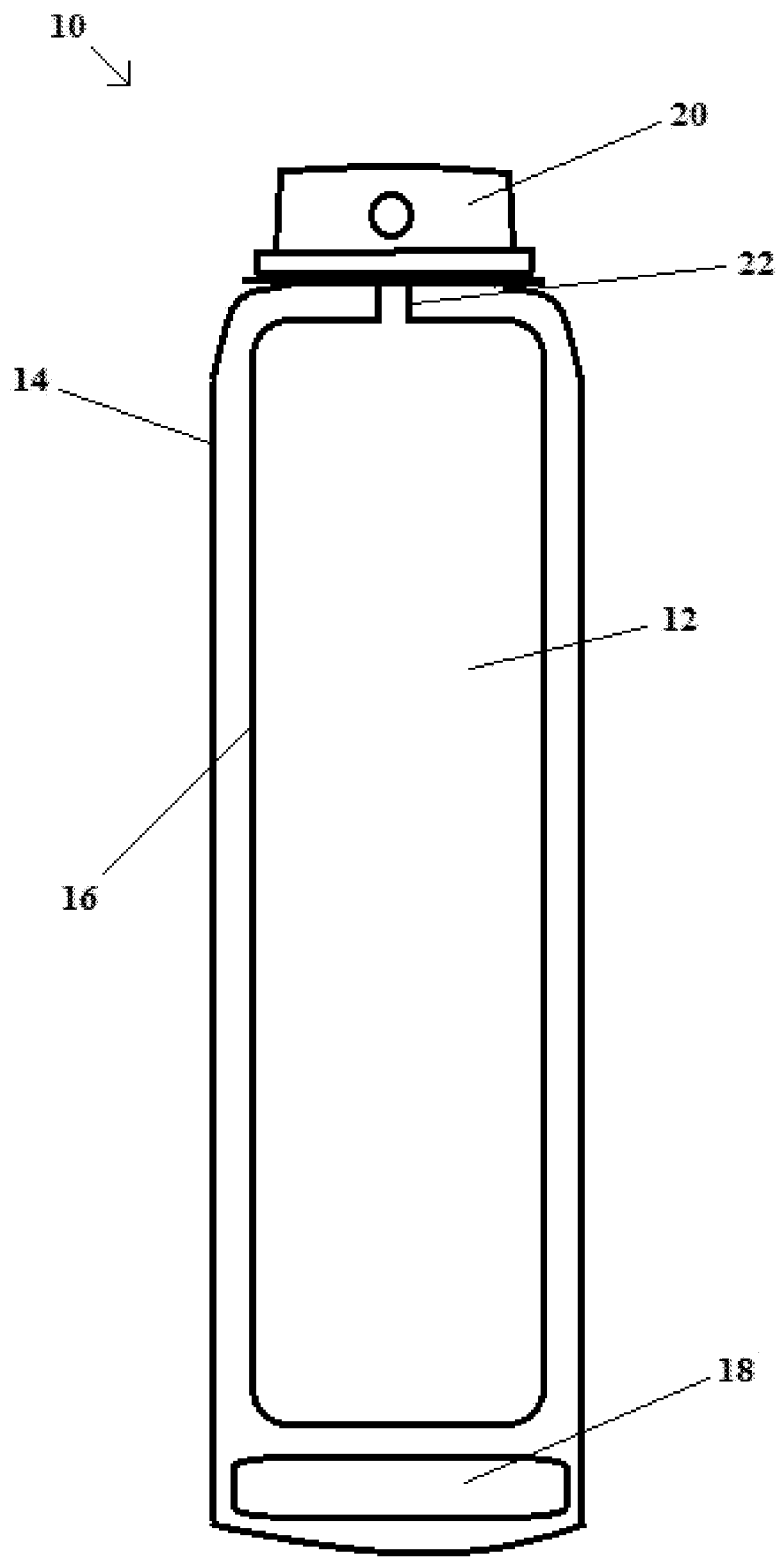
FIG. 1A: Non-limiting schematic illustration of an aerosol system for spraying a strippable coating composition.
Figure 1B:
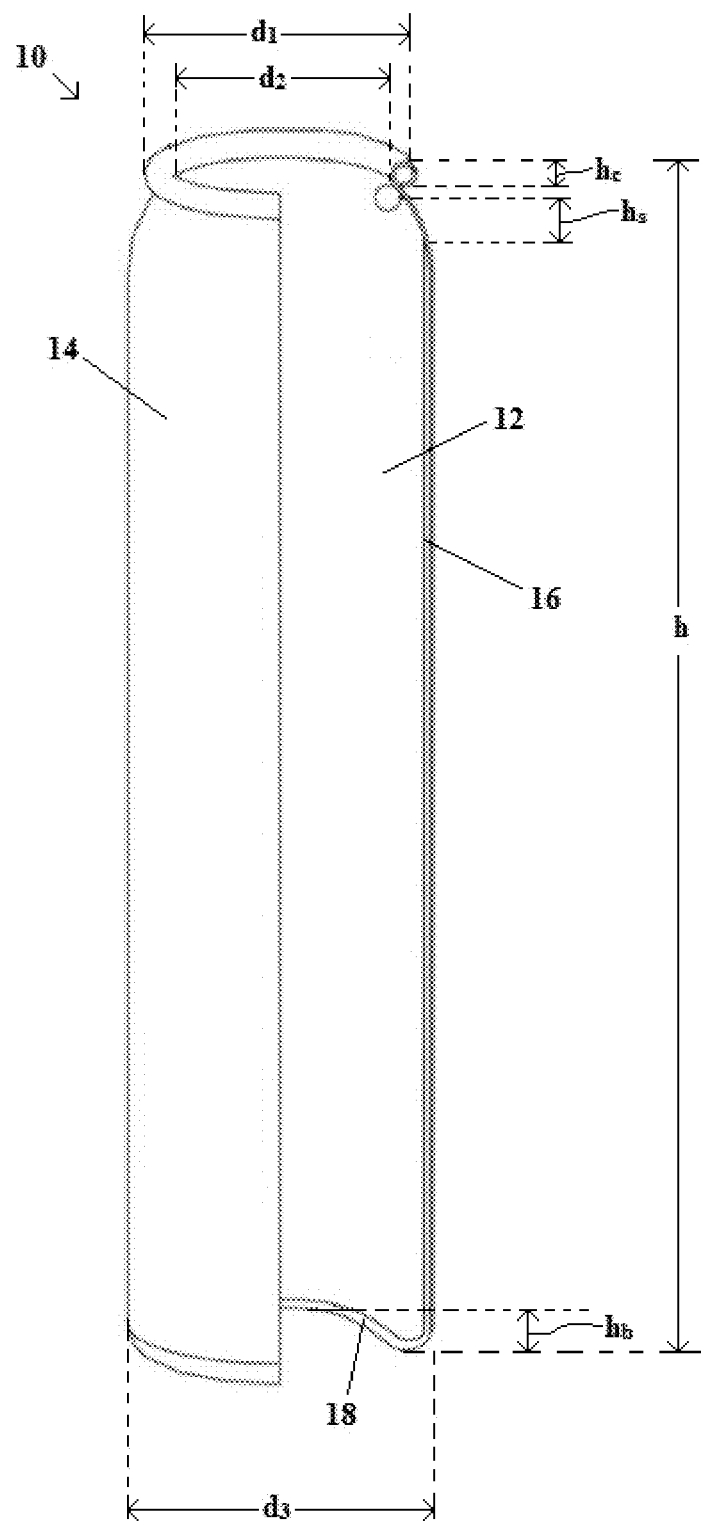
FIG. 1B: Cutaway view of a canister for an aerosol system.
Figure 1C:
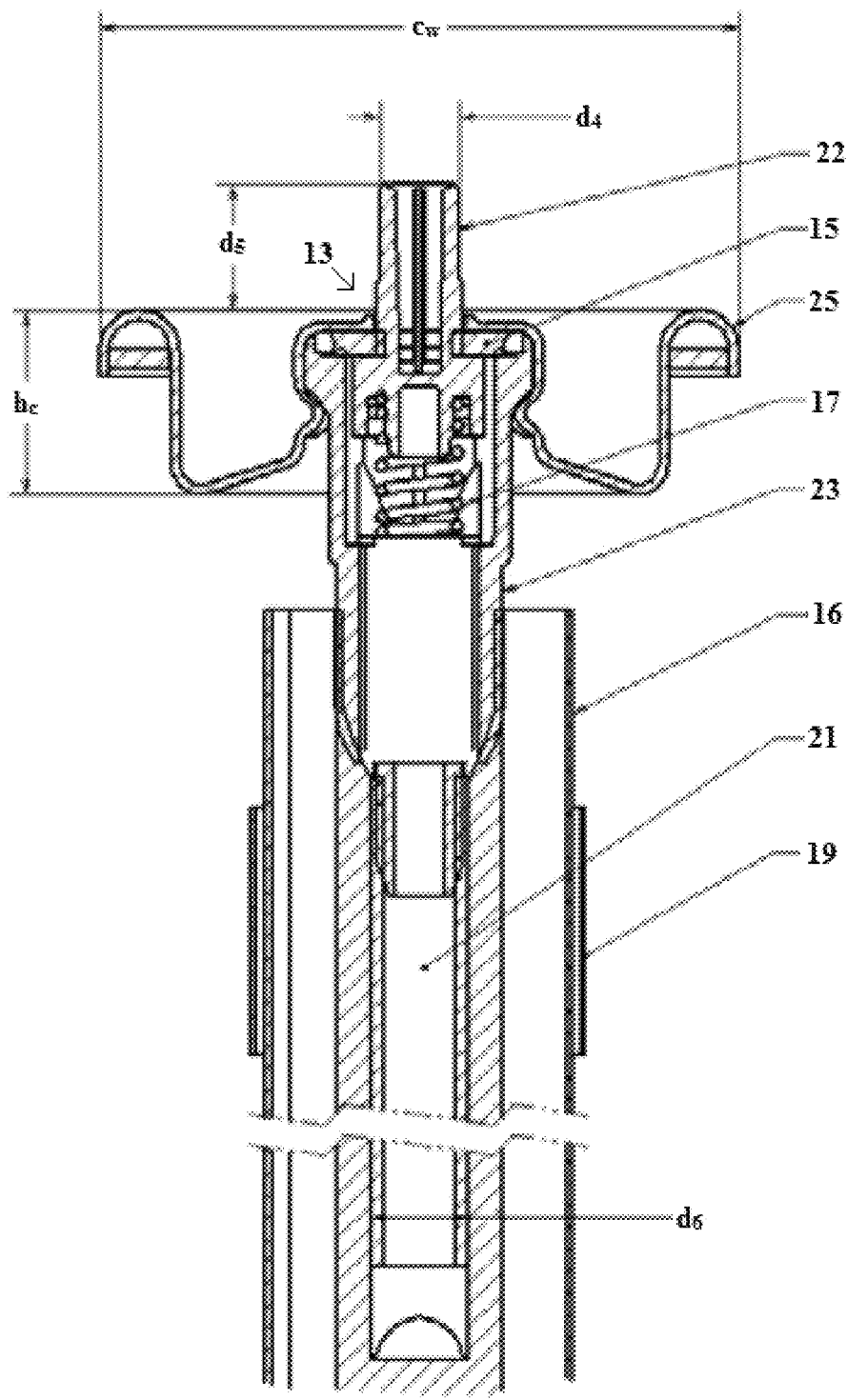
FIG. 1C: Cross-sectional view of part of a canister for an aerosol system showing a valve.

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

It is noted at the outset that all "wt %" values described herein are relative to the total weight of the composition, unless indicated otherwise.

To prevent secondary exposure through inhalation or cross contamination, it is important to contain or encapsulate deadly aerosols. Provided herein is a composition, which may be applied in the form of a misting agent or aerosol spray, which can encapsulate and contain harmful aerosols, improving the safety of first interactors such as law enforcement officers during these incidents.

Provided is a composition which forms a strippable coating designed for application to surfaces contaminated with harmful substances, or which are believed to be possibly contaminated with harmful substances. The coating is a high solids, latex-based product that is advantageously useful for rendering safe surfaces that are contaminated with substances such as fentanyl, beryllium, asbestos, radiological nucleotides (e.g., plutonium, uranium, or the like), or any other toxic or problematic particulate. The composition is useful as an aerosol capture product, and is especially advantageous in narcotics investigations or events, unknown white powder events, and related areas of emergency response. Advantageously, in some embodiments, the composition is non-toxic, non-hazardous, non-flammable, and does not support biological growth.

In some embodiments, when the composition is applied over a contamination, the contamination is encapsulated by the strippable coating formed by the composition. This use of the composition provides a controlled decontamination process, which reduces the potential for re-suspension and inadvertent spread of contamination. For instance, in the narcotics context, the use of the composition on a narcotic such as fentanyl may prevent law enforcement personnel from inadvertently inhaling or cross contaminating others with the fentanyl.

The composition includes a latex polymer component. In general, latex is a dispersion or emulsion of polymer microparticles in an aqueous medium. Latex can be manufactured by, for instance, polymerizing a monomer, such as styrene, that has been emulsified with surfactants. Alternatively, latex may be naturally produced from certain plants or trees. The latex polymer component is included in the composition in an amount ranging from about 50 wt % to about 95 wt % of the composition. In some embodiments, the latex polymer component is present in the composition in an amount ranging from about 80 wt % to about 90 wt %. In one non-limiting example, the latex polymer component is present in the composition in an amount of about 87 wt %.

In some embodiments, the latex polymer component is a vinyl acrylic latex polymer component. Suitable latex polymer components include, but are not limited to: n-butyl acrylate-based latex, such as the latex emulsions commercially available under the name UCAR™ latex acrylic emulsions, for example UCAR™ Latex DC 3560 (also referred to herein as "UCAR 3560"); butyl acrylate/vinyl acetate copolymer latex emulsions, such as combinations of butyl acrylate polymer and poly(oxy-1,2-ethaanediyl)-alpha-(4-nonylphenyl)-omega-hydroxy-vinyl acetate; and combinations thereof. However, it is understood that a wide variety of different latex polymer components may be used in the composition. In one non-limiting example, the composition includes UCAR™ Latex DC 3560 in an amount ranging from about 40 wt % to about 50 wt % of the composition. UCAR™ Latex DC 3560 is a vinyl acrylic latex emulsion with a solids content of about 60%, a pH of about 4.7, a latex weight per gallon of about 9.2 lbs, a particle size of about 0.25 microns, and a viscosity of about 500 cP.

In some embodiments, the composition includes an anti-freeze component, such as propylene glycol, in an amount ranging from about 1 wt % to about 10 wt % of the composition. The anti-freeze component is useful in preventing the composition from freezing within an aerosol can. In one non-limiting example, the composition includes propylene glycol in an amount ranging from about 2 wt % to about 3 wt % of the composition. However, other anti-freeze components are possible and entirely encompassed within the present disclosure.

In some embodiments, the composition includes a coalescing aid, which acts as a temporary plasticizer by lowering the glass transition temperature of the latex. Suitable coalescing aids include, but are not limited to: 2,2,4-trimethyl-1,3-pentanediol monoisobutyrate, which is available commercially under the trademark UCAR™ Filmer IBT; propylene glycol n-butyl ether (also known as 3-butoxypropan-2-ol or propylene glycol monobutyl ether); ethylene glycol phenyl ether; dipropylene glycol n-butyl ether; diethylene glycol monobutyl ether; ethylene glycol monobutyl ether; triethylene furoate; methoxyethyl furoate; 2-alkyl-1,3-hexanediol alkyl esters, such as 2-ethyl-1,3-hexanediol monobutyrate, 2-ethyl-1,3-hexanediol isobutyrate, 2-methyl-1,3-hexanediol isobutyrate, or 2-methyl-1, 3-hexanediol monobutyrate; or combinations thereof. The coalescing aid may be present in the composition in an amount ranging from about 0.01 wt % to about 7 wt %. In one non-limiting example, the coalescing aid is present in the composition in an amount of about 3 wt %.

In some embodiments, the composition includes an antimicrobial agent. The antimicrobial agent is typically present in the composition in an amount ranging from about 0.01 wt % to about 0.5 wt %, and serves to inhibit the growth of bacteria and fungi around the applied coating. Suitable antimicrobial agents include, but are not limited to: sodium omadine, sources of silver ions, triclosan, chlorhexidine, nitrofurazone, benzalkonium chlorides, or combinations thereof.

In some embodiments, the composition includes a defoamer. Suitable defoamers include, but are not limited to: siloxane-type defoamers, such as the defoamer commercially available under the trademark Airex™ 901 W, which is a polyether siloxane copolymer containing fumed silica; silicone-free defoamers, such as the defoamer commercially available under the trademark DAPRO® DF 537, which is a mineral oil-based defoamer; mixtures of polysiloxanes and glycols; blends of esters, hydrophobic silica, and emulsifiers; emulsions of glycols and modified polysiloxanes; or combinations thereof. The defoamer is generally present in an amount ranging from about 0.0001 wt % to about 0.1 wt %. The defoamer acts to prevent the formation of bubbles or foam in the composition.

In some embodiments, the composition includes a dispersant, in an amount ranging from about 0.01 wt % to about 2.0 wt %. The dispersant prevents agglomeration of particles within the composition. Suitable dispersants include, but are not limited to: 2-amino-2-methyl-1-propanol (AMP); condensed phosphates, such as tetrapotassium pyrophosphate (TKPP) or potassium tripolyphosphate (KTPP); polymers of the form $(AB)_n$, $B(AB)_n$, or $(AB)_nA$, where n is from 2 to 75, A is a hydrophobic segment, and B is a hydrophilic segment; $[CH_2O(CH_2CH_2O)_mCH_2COOC_7H_{14}OCO]_n$, where m and n are integers; $[CH_2O(CH_2CH_2O)_mCH_2COOC_8H_{16}OCO]_n$, where m and n are integers; $C_8H_{17}OCOCH_2O(CH_2CH_2O)_m CH_2COOC_8H_{17}$, where m is an integer; sodium polyacrylate; sulfonated melamine; and combinations thereof.

In some embodiments, the composition includes one or more surfactants. Suitable surfactants include, but are not limited to: silicone surfactants, such as the silicon surfactant commercially available under the trademark Dow Corning® 193 Additive ("DC 193"), which is a general purpose surfactant suitable for rigid foam and microcellular foam applications; alkyl ethyoxylates; alkyl/aryl sulfonates and sulfates; PEG-120 methyl glucose dioleate; polyvinyl alcohol/polyvinyl acetate copolymers; polyalkylmethacrylate/ hydrophilic block copolymers; organoalkoxysilanes, such as 3-aminopropyltriethyoxysilane (APS), methyl-triethyoxysilane (MTS), phenyl-trimethyoxysilane (PTS), vinyl-triethoxysilane (VTS), or 3-glycidoxypropyltrimethoxysilane (GPS); anionic surfactants, such as sodium lauryl sulfate; amphoteric surfactants, such as N,N-dimethyl-N-lauryl-N-(3-sulfopropyl) ammonium betaine; blends of cationic, amphoteric, and nonionic surfactants; or combinations thereof. The surfactant acts to lower the interfacial tension of the composition, and allows the emulsification of reactive vinyl monomers, as well as for the formation of stable colloidal dispersions of polymer particles.

In some embodiments, the composition further includes a homogenization aid, such as lecithin, in an amount ranging from about 0.1 wt % to about 2.0 wt %. Lecithin is an amphiphilic (i.e., both hydrophilic and lipophilic) fatty substance, composed of a mixture of glycerophospholipids, that aids in homogenizing the composition. However, other homogenization aids are possible and entirely encompassed within the scope of the present disclosure.

In some embodiments, the composition further includes a disinfectant. In some embodiments, the composition further includes an additional ingredient for neutralizing narcotic substances such as heroin or fentanyl.

The composition may include one or more dyes, such as an orange dye. The color of the composition can be customized by the identity and amount of dye added. The dye(s) can be present in an amount ranging from about 0.01 wt % to about 1.0 wt %. Optionally, the composition can be made fluorescent so that it is more readily visible in the dark. To make the composition fluorescent, one or more fluorescent dyes can be added to the composition.

The composition may also further include various additives, in amounts up to about 5 wt %. Suitable additives include, but are not limited to, light stabilizers, UV absorbers, anti-oxidants, thermal stabilizers, foaming aids, adhesion promoters, oxygenated hydrocarbons, fragrances, porogens, coating strength-enhancers, or other processing aids or enhancers. The composition may further include a suitable amount of water, such as from about 0.5 wt % to about 50 wt %.

In some embodiments, the composition has a viscosity low enough to facilitate its delivery via aerosol spray or misting agent. In some embodiments, the composition has a viscosity that is less than or equal to about 90 cP. In some embodiments, the composition has a viscosity that is less than or equal to about 85 cP. In one non-limiting example, the viscosity of the composition is about 88 cP. The composition is generally a white or off-white thick liquid at room temperature under standard pressure, though the color can be customized by the dye(s) added, and has a slight odor of latex. The composition can have a pH ranging from about 6.5 to about 8.0. The composition is a water-based, and water soluble, product that poses a very low fire hazard. While it may not burn, it can splatter and froth. Therefore, care should be taken when spraying the composition into a hot material. Fog may be used to cool surrounding fire before application of the composition. In some embodiments, the composition is stable at temperatures up to at least 122° F.

In one non-limiting example, the composition includes water in an amount ranging from about 35 wt % to about 40 wt %, butyl acrylate polymer in an amount of less than 51 wt %, poly(oxy-1,2-ethaanediyl)-alpha-(4-nonylphenyl)-omega-hydroxyl-vinyl acetate in an amount of less than 2 wt %, vinyl acetate in an amount ranging from about 0.03 wt % to about 0.06 wt %, acetaldehyde in an amount of less than 0.02 wt %, propyelene glycol in an amount ranging from about 2 wt % to about 3 wt %, oxygenated hydrocarbons in an amount ranging from about 2 wt % to about 3%, and other additives in an amount ranging from about 1 wt % to about 5 wt %.

In one non-limiting example, the composition has a boiling point of about 212° F., a freezing point of about 27° F., a specific gravity of about 1.0-1.2 at 68° F., a density of about 9.25 lbs/gal, a pH of from about 6.5 to about 8.0, a vapor pressure of about 1.4 mm Hg at 68° F., and a viscosity of less than or equal to about 90 cP.

In general, the composition is applied as a liquid, cures to an orange (or other customizable) color, and is a highly elastic coating which is easily removed by peeling. Once stripped off the surface by peeling, any contaminants or harmful substances that were absorbed into the coating can be readily analyzed within the composition in a safe environment.

To make the composition, certain ingredients should be mixed together prior to mixing with the remaining ingredients. For example, dye is typically difficult to disperse in the material completely, so the dye should be mixed completely prior to mixing with the other ingredients. Furthermore, the dissolved dye should be mixed together with any of the surfactant, anti-freeze component, and homogenization aid that are desired to be in the composition before these components are mixed with the latex polymer component, defoamer, anti-microbial agent, dispersant, and coalescing aid.

To begin preparation, any one of the latex polymer component, defoamer, anti-microbial agent, dispersant, and coalescent aid is added to water and blended together. Then, each successive ingredient from the list of latex polymer component, defoamer, anti-microbial agent, dispersant, and coalescent aid (if all are to be present) is added to the mixture one at a time. For optimal results, the working mixture should be blended for about 5-10 minutes after each of the latex polymer component, defoamer, anti-microbial agent, dispersant, and coalescent aid is added. Once these components have been mixed together, the mixture is combined with a pre-made mixture of any of the water, dye, surfactant, anti-freeze component, and homogenization aid that are desired in the composition.

Known strippable coatings are not aerosolized, for instance because of their high viscosity or because of a tendency to freeze inside an aerosol can. For example, previous latex-based coating compositions have been problematic being delivered by aerosol because the compositions would freeze before the aerosol cans could be emptied. A common problem with latex-based compositions is that of destabilization due to freezing and thawing. For example, during freeze-thaw cycling, anionic surfactants tend to desorp from the latex particles, thereby increasing the ionic strength of the aqueous phase and ultimately resulting in coagulation due to destabilization of the electronic double layer surrounding each particle. Thus, the viscosity of latex-based compositions tends to vary as more freeze-thaw cycles occur.

However, it has been found that the present composition is suitable for aerosol delivery. A non-limiting example of a canister for aerosol delivery of the composition is a bag-on-valve aerosol system, such as that depicted in FIGS. 1A-1C. Referring now to FIGS. 1A-1C, an aerosol system 10 for delivering the composition 12 by aerosol includes a canister 14 having a customizable shape and size, a bladder 16 for holding the composition 12 disposed within the canister 14, propellant 18 below the bladder 16 or otherwise between the bladder 16 and the canister 14, and an actuator 20 connected to the canister 14 via a valve stem 22. In some embodiments, the propellant 18 surrounds the bladder 16. Optionally, a cap can be provided over the actuator 20 to prevent accidental spraying. A wide range of actuators 20 are possible, depending on product demands, and are encompassed within the present disclosure. The valve stem 22 may accommodate a female or a male valve.

The bladder 16 ensures that there is complete separation between the composition 12 and the propellant 18 within the canister 14. The propellant 18 is disposed in an area between the bladder 16 and the walls of the canister 14. In some embodiments, the bladder 16 is a laminated multi-layered bag that is rollable and serves as a flexible pouch. The bladder 16 is attached to the valve stem 22. The bladder 16 can be made in a wide range of sizes depending on the size of the canister 14.

Referring now to FIG. 1C, a non-limiting example valve 13 is depicted as including an inner gasket 15, a valve spring 17, and a valve stem 22. A housing 23 made of a suitable material, such as polypropylene, may enclose a valve stem 22, inner gasket 15, and valve spring 17. The inner gasket 15 forms a seal when the actuator 20 is not depressed, so as to prevent composition 12 in the bladder 16 from exiting the canister 14. The inner gasket 15 may be made from any suitable material such as Buna-N (also known as nitrile rubber or acrylonitrile butadiene rubber), neoprene, butyl, or viton. The valve spring 17 may be stainless steel, and may deform upon depression of the actuator 20. The valve spring 17 is configured to return the valve 13 to a sealed condition when a force is not being applied to depress the actuator 20. In other words, the valve spring 17 closes the seal when the actuator 20 is released. A mounting cup 25 may form the link between the canister 14 and the valve 13, and may define an outer perimeter of the canister 14. The mounting cup 25 may hold the parts of the valve 13 together, and may attach the valve 13 to the canister 14. The mounting cup 25 may be tinplate or aluminum, and may optionally include a coating such as epoxy, PP laminate, PET, or micoflex.

Tape 19 may surround all or part of the bladder 16 to hold the bladder 16 in place. A dip tube 21 may be disposed within the bladder 16 to draw composition 12 from the bladder 16 into the valve 13. The dip tube 21 may aid with the dispensing of viscous composition 12. The dip tube 21 may be any suitable material, such as low-density polyethylene (LDPE).

To fill the canister 14, the propellant 18 is charged into the canister 14. Suitable propellants 18 include, but are not limited to, compressed air, nitrogen, or combinations thereof. Then, the valve stem 22 with the bladder 16 attached is crimped onto the canister 14, such as through valve gassing. The composition 12 is then forced through the aerosol valve stem 22 to fill the bladder 16. Finally, the actuator 20 and optional cap are placed on the canister 14. In some embodiments, an aerosol canister 14 charged with the composition has a shelf life of at least 1-2 years. In some embodiments, the canister 14 contains about 1.5 ounces, though the size of the canister 14 is not particularly limited.

In some embodiments, the canister 14 is made from aluminum. However, other materials are possible. Referring now to FIGS. 1B-1C, in one non-limiting example, the canister 14 has a height h of about 110 mm, a curled outer diameter $d_1$ of about 31.3 mm, a curled inner diameter $d_2$ of about 25.4 mm, a bottom deformation height $h_b$ of about 5 mm, an outside diameter $d_3$ of about 35 mm, a contact height $h_c$ of about 4.25 mm, and a shoulder height $h_s$ of about 7.7 mm. The valve stem 22 may have a stem outer diameter $d_4$ of about 0.158 in. The distance $d_5$ from the top of the valve stem 22 to the curl of the mounting cup 25 may be about 0.245 in. The cup height $h_c$ may be about 0.37 in, and the cup weight $w_c$ may be about 1.286 in. The dip tube 21 may have a diameter $d_6$ of about 0.193 in. However, many other dimensions for the canister 14 are possible and encompassed within the scope of the present disclosure.

FIGS. 2A-2F depict embodiments of a non-limiting example actuator 20. The actuator 20 may be made out of any suitable material, such as polypropylene. Referring to FIGS. 2A-2F, the actuator 20 may include a head 24 within a base member 26. The base member 26 may include a side wall 28 which encircles the head 24 around at least a bottom portion 30 of the head 24. As seen in FIG. 2E, the base member 26 may have a circular shape defining a perimeter within which the head 24 is contained. The head 24 may include a top portion 32 exposed above at least a portion of the side wall 28. The side wall 28 may include a lip 34 which extends a greater height than the rest of the side wall 28. The head 24 is depressible by pushing downward (i.e., toward the canister 14) on the top surface 36, thereby depressing the actuator 20. The head 24 may include ridges 38 for enhanced grip and an orifice 40 configured to spray or otherwise release composition 12.

Figure 2A:
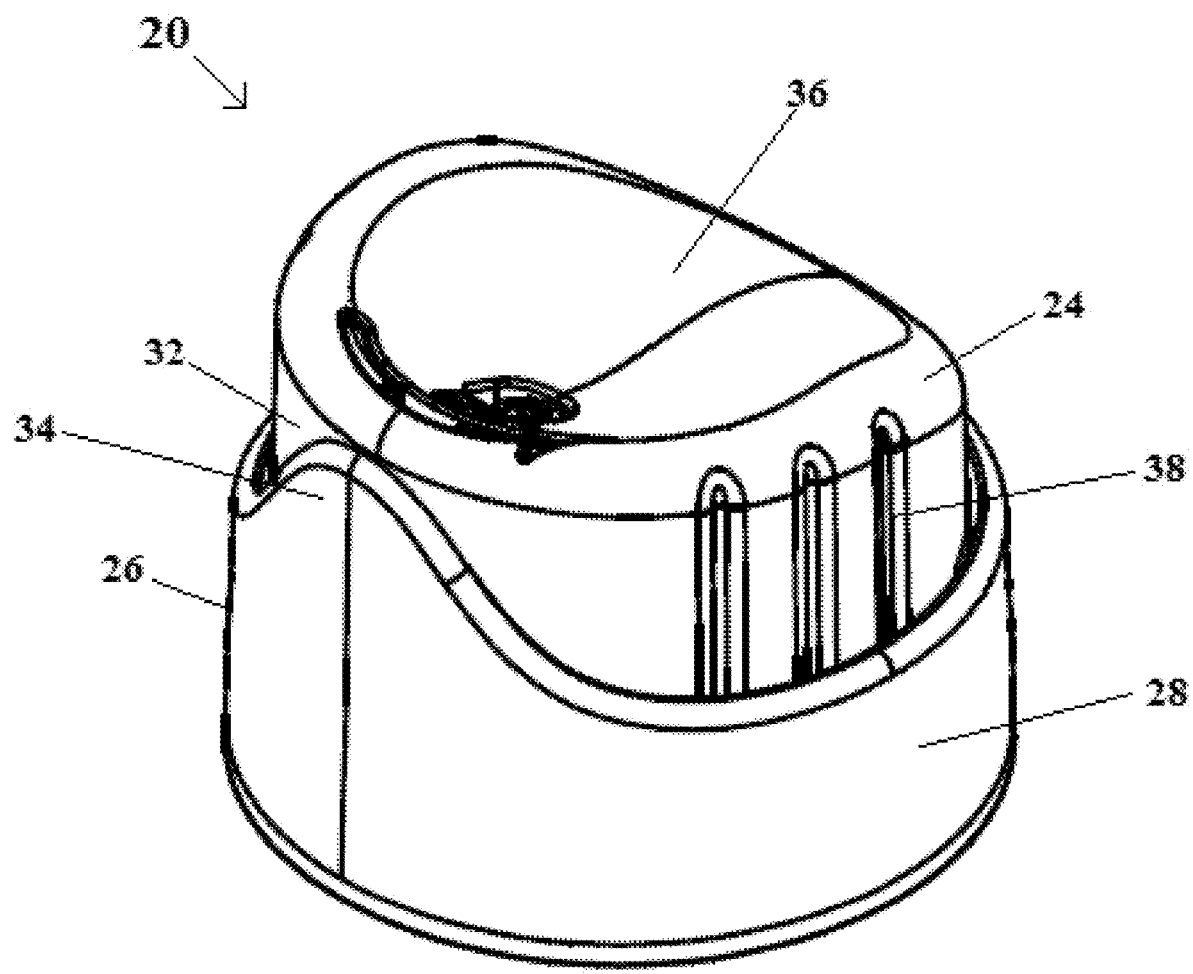
FIGS. 2A-2F: Non-limiting schematic illustrations of an actuator for an aerosol system.
Figure 2B:
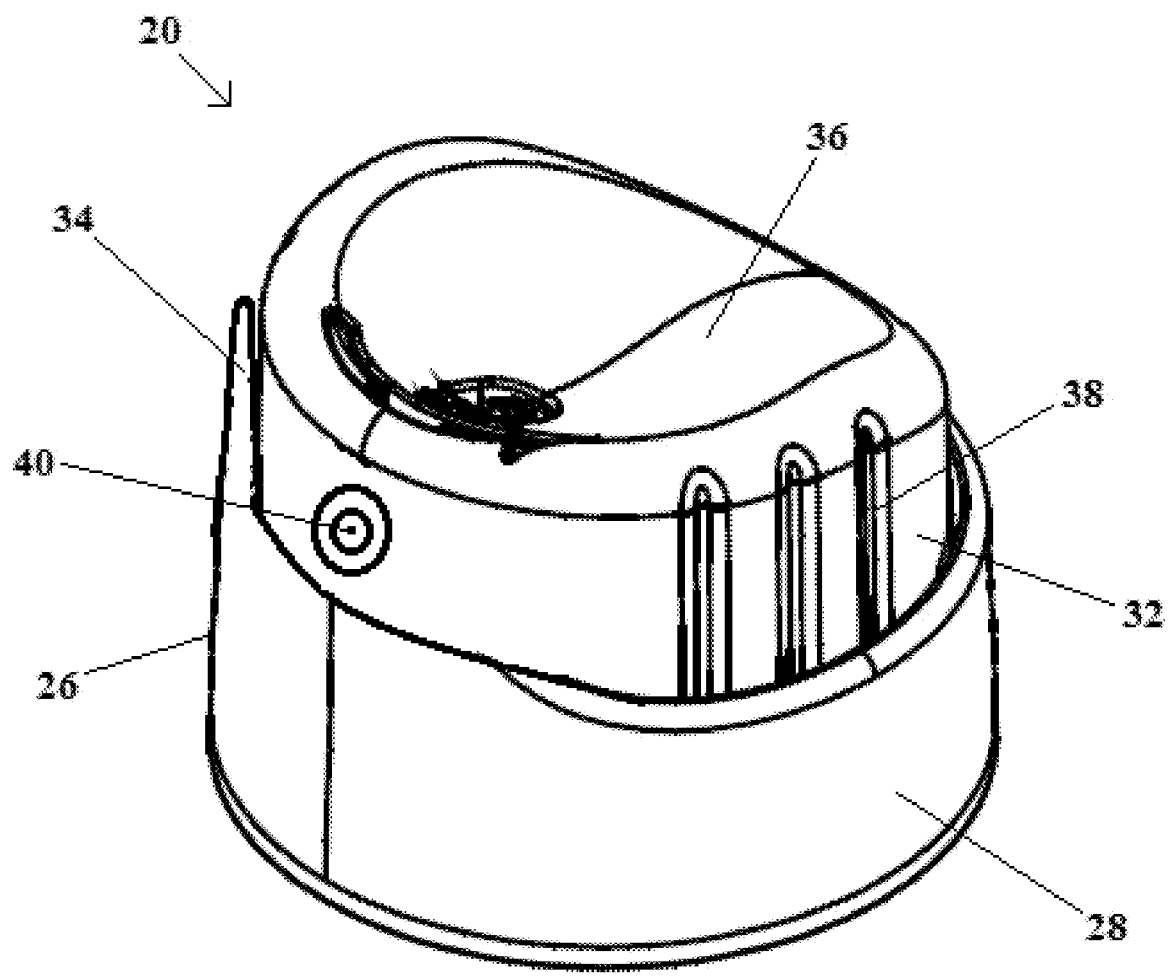
Figure 2C:
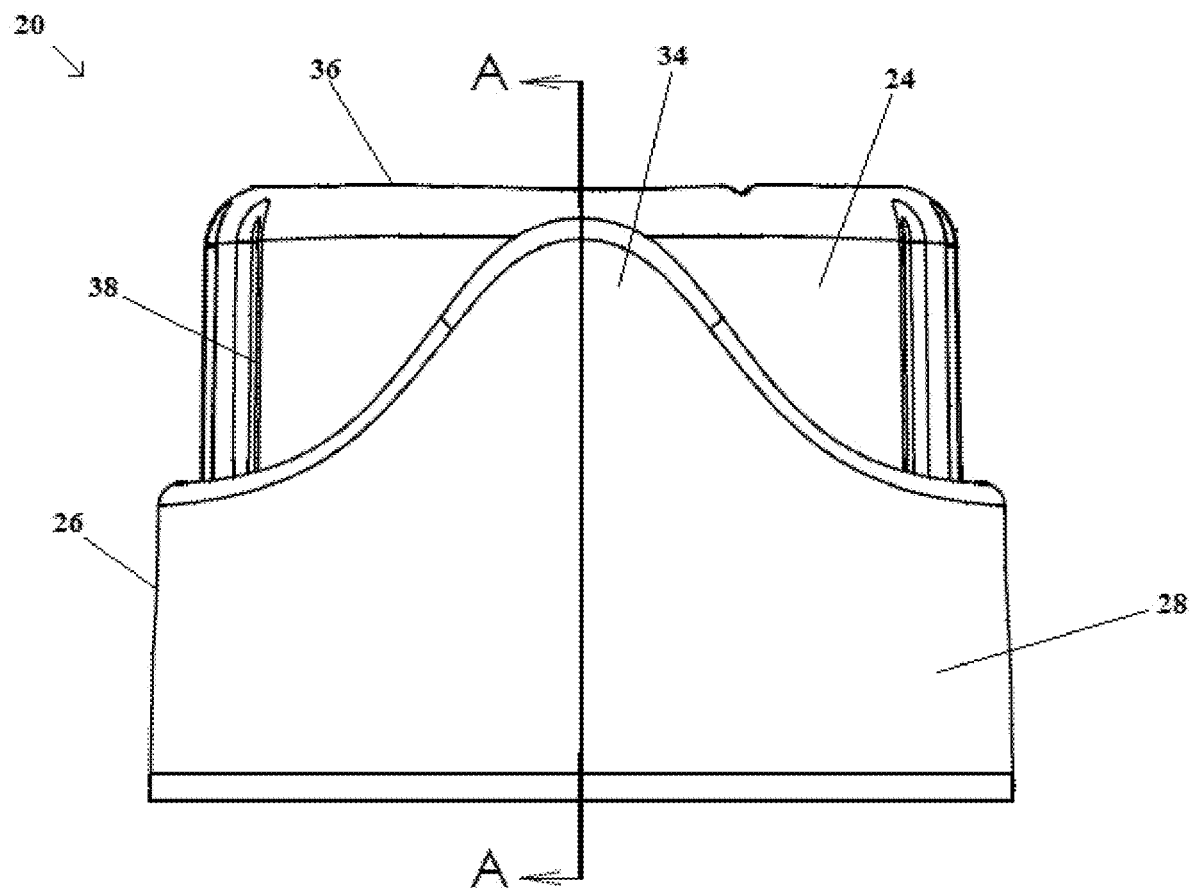
Figure 2D:
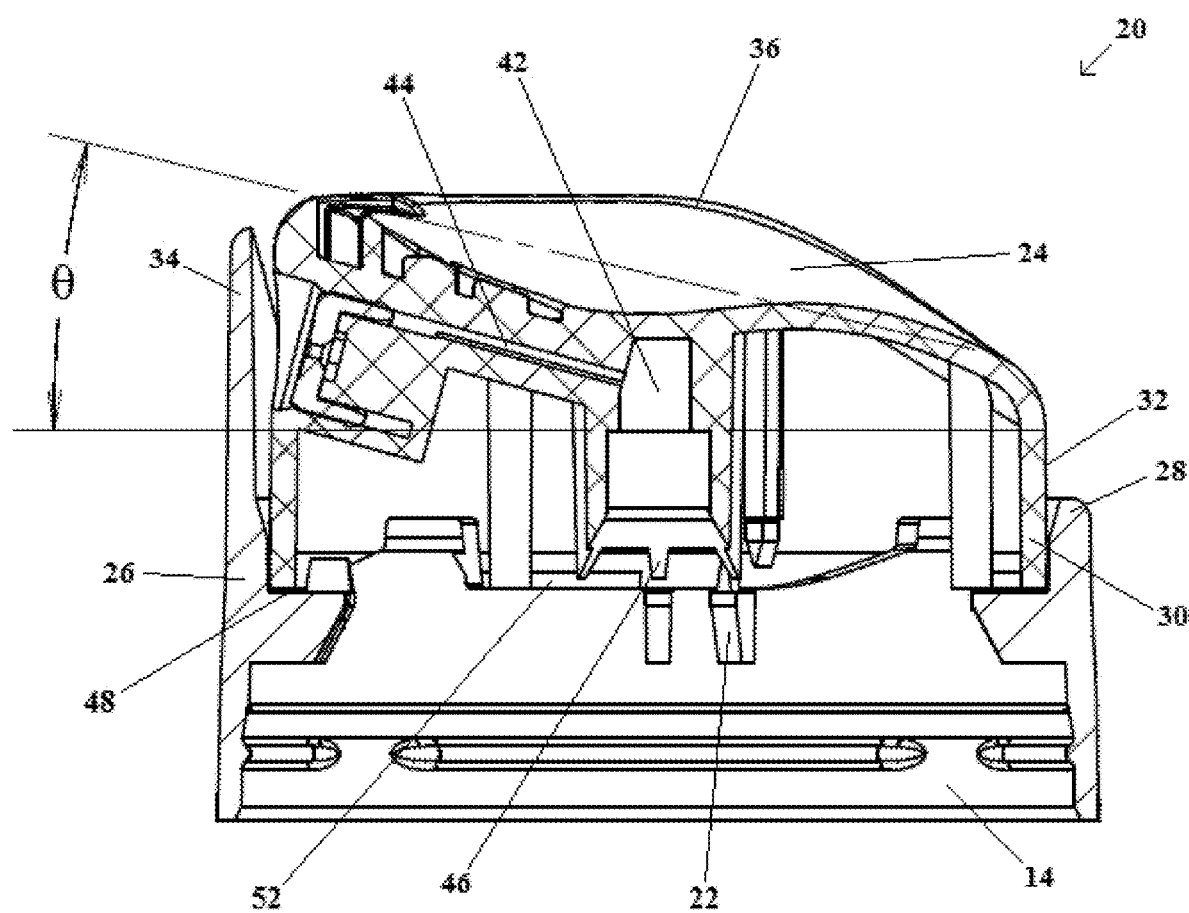
Figure 2E:
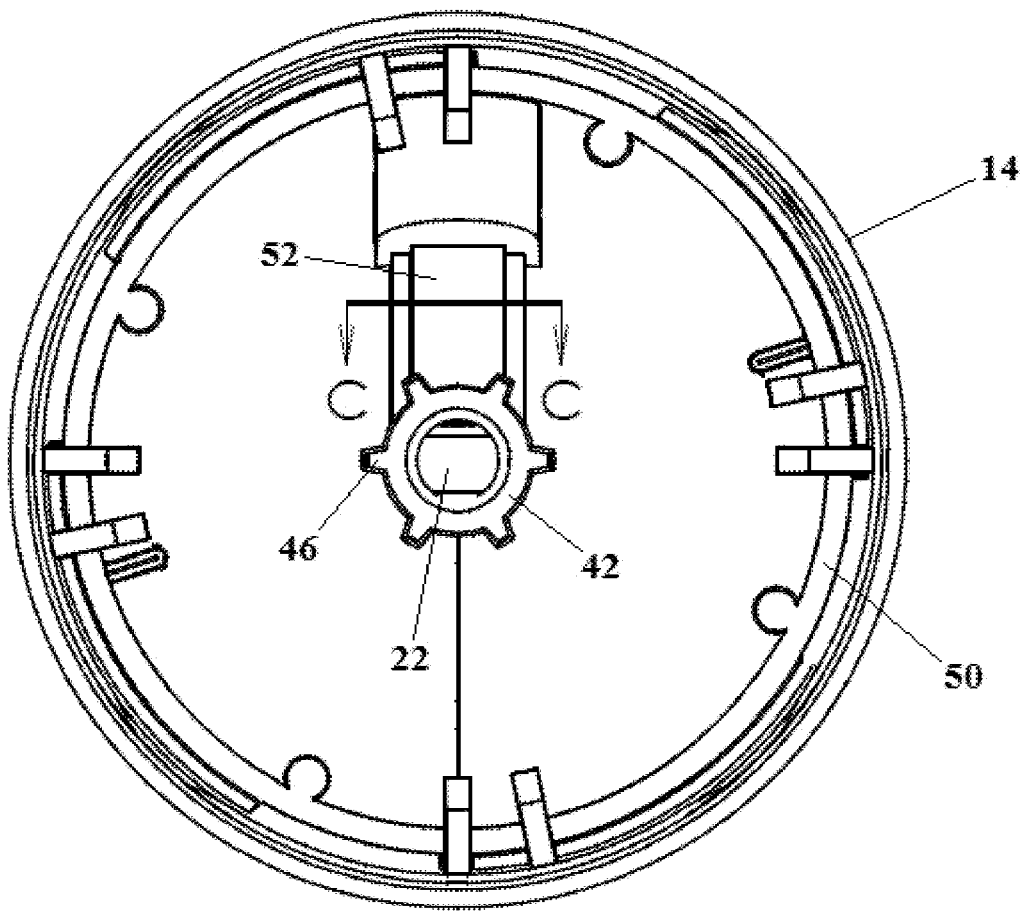

As seen from FIGS. 2A-2B and 2E, the head 24 may be rotatable within the base member 26 around a track 50. FIG. 2A shows the actuator 20 in a first state of rotation, where the orifice 40 is blocked by the lip 34 of the side wall 28. FIG. 2B shows the actuator 20 in a second state of rotation, where the orifice 40 is exposed and able to freely spray composition 12 when the actuator 20 is depressed. In the first state of rotation, the lip 34 of the side wall 28 may act as a safety shield by blocking the orifice 40, so as to prevent composition from being sprayed in direct manner. However, this safety feature is not strictly necessary.

Referring to FIG. 2D, a center pin 42 may be disposed within the head 24, and may fluidly connect the valve stem 22 to the orifice 40, for example through a tube 44. As seen in FIG. 2D, the tube 44 may be angled at an angle $\theta$ with respect to a line parallel to the bottom wall 48 of the head 24. The angle $\theta$ may be, for example, about 13°. However, other angles are possible and encompassed within the scope of the present disclosure. The center pin 42 may also include prongs 46. The center pin 42 may be hollow or have a channel formed therein to convey composition 12 from the valve stem 22 to the tube 44.

Figure 2F:
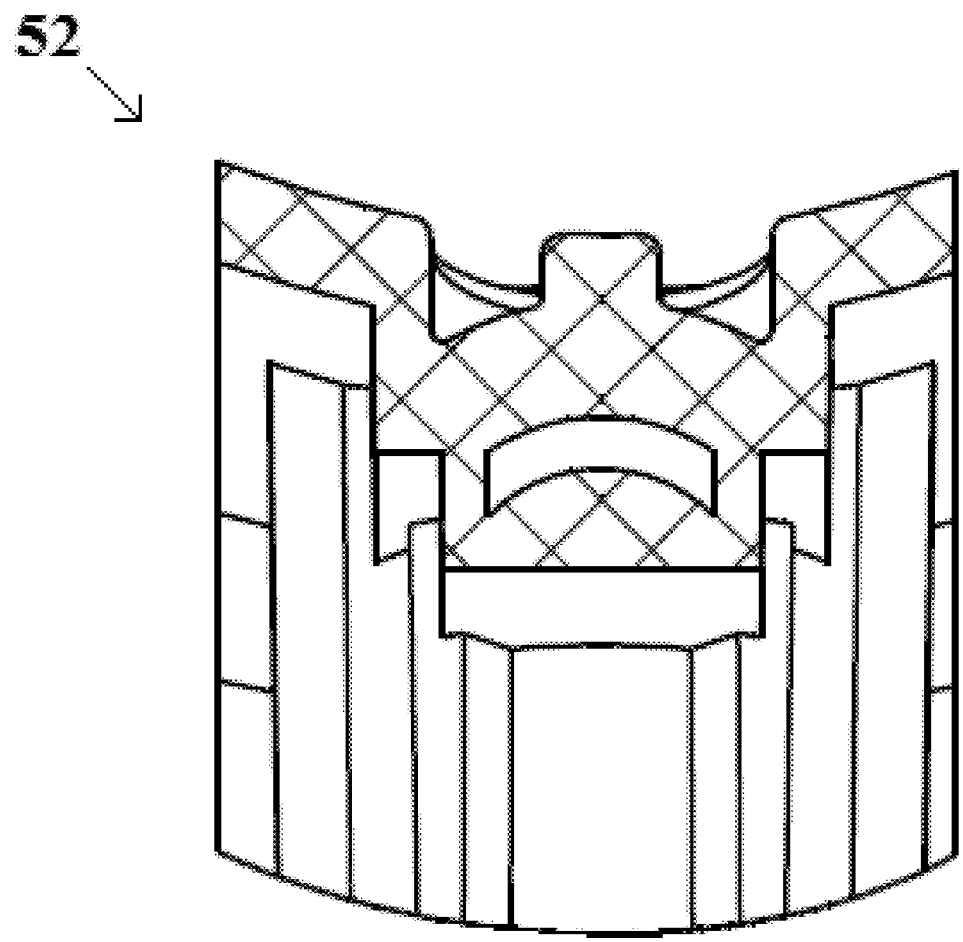

FIG. 2C shows the actuator 20 in an undepressed position, where the head 24 has not been depressed. FIG. 2D shows a cross-section taken along line A-A in FIG. 2C. As seen in FIG. 2D, the center pin 42 may include prongs 46 which, when the actuator 20 is depressed, engage a mechanism 52 (seen in FIGS. 2E-2F) to break the seal created by the inner gasket 15 (i.e., open the valve 13), and thereby cause a path to open from the bladder 16 to the center pin 42 through the valve stem 22. When the actuator 20 is depressed, the pressure inside the canister 14 from the propellant 18 forces composition 12 in the bladder 16 through the dip tube 21, valve stem 22, center pin 42, tube 44, and out the orifice 40 as a spray or mist. The actuator 20 may atomize the composition 12 while passing through the actuator 20 to the orifice 40. When the actuator 20 is released, the valve spring 17 returns the valve 13 to a sealed position, thereby closing the path from the bladder 16 to the center pin 42.

It has been found that the composition of the present disclosure may be delivered via a bladder-type or bag-on-valve aerosol system without freezing up prior to expelling the entire amount of composition. Rather, the entire amount of composition charged into the aerosol canister may be discharged from the canister. The pressurized propellant, and the separation of the propellant from the bladder, combined with the fact that the composition includes an anti-freeze component, prevent the freezing of the composition within the canister, rendering the composition suitable for aerosol delivery. Aerosol delivery is advantageous because it facilitates easier transport and use by first interactors such as law enforcement personnel. Though an aerosol delivery of the composition is described for exemplary purposes, it is understood that the composition may be delivered by other methods, such as fogging, and may nonetheless be used in the same manner.

The composition is especially useful for rendering safe surfaces contaminated with drugs, such as crime scenes, or radioactive or other hazardous material. The composition can stabilize radiological, beryllium, asbestos, or other hazardous contaminations. Ducts, areas behind and under equipment, pipes, and other areas that are difficult to access, and are typically found in contaminated facilities, are more easily covered with the composition through the aerosol delivery. In one non-limiting example, the composition is packaged in a 4-12 oz aerosol can. In one non-limiting example, the composition is packaged in an aerosol can that is smaller than 4 oz, having a bladder that is 1.7 oz. In another non-limiting example, the composition is packaged in a 1.5 oz aerosol can. These sizes of aerosol cans are easily carried by law enforcement narcotic teams and other first interactors for encapsulating potential narcotic substances.

To use the composition, the composition is sprayed, deployed as a misting agent, or otherwise delivered (such as by a fogging apparatus, a misting apparatus, a garden sprayer, or the like) into an area or directly onto surfaces which are, or which may be, contaminated with a harmful substance. When delivered through a misting or fogging technique, the composition can capture contaminant particles in the air. Responders can use a fogger tip to disperse the composition into a generalized area encapsulating as much of the contaminant as possible.

The composition can be easily dispersed from a safe distance, such as, for example from about 2 feet away from the substance in question, closing the distance as the composition is deployed. If necessary, though, the composition can also be easily dispersed from a possibly unsafe distance, such as within a few inches of the substance in question, although such use is not recommended because of safety concerns. When the composition contacts the substance, the substance is pulled in and encapsulated. Once encapsulated, the harmful substance cannot be spread or become airborne, which prevents injuries to persons near the harmful substance. In some embodiments, the composition forms a peelable membrane (i.e., a strippable coating or a pliable skin) on the surface in about 7 minutes, containing the harmful substance. However, curing time may vary in humid or cold conditions, and may vary based on the amount of composition which is deployed. In some embodiments, the composition forms a strippable coating in about 5 minutes. In other embodiments, the composition forms a strippable coating in about 15 minutes. The strippable coating can be removed easily by peeling. When the strippable coating is peeled off the surface, the harmful substance is removed with the strippable coating, thereby decontaminating the surface. Importantly, the harmful substance is preserved in the strippable coating for later analysis. For instance, law enforcement may use the composition to decontaminate and render safe a surface with a substance believed to be a narcotic on it. The strippable coating can then be removed, and the coating can be analyzed in a laboratory to determine the composition of the substance believed to be a narcotic.

As a safety precaution, care should be taken when directly spraying a harmful substance with the composition, in order to not propel the harmful substance into the air from the force of the spray. Thus, it may be preferable to aim the spray slightly away from or above the target area. Deploying the composition slightly above the target area ensures the target is being impacted but not with the full potential energy of the spray or misting agent. Furthermore, the skilled person will recognize that it is advisable to wear appropriate protective equipment based on the identity of the harmful substance being contained. To dispose of spilled composition, the waste material can be coagulated by the addition of sand, clay, or other earth material. Agencies may use their individual disposal protocols to collect or dispose of the composition containing an unknown substance.

As non-limiting examples, the composition is useful for law enforcement personnel, fire departments, paramedics, DEA agents, homeland security personnel such as TSA agents, postal carriers, shipping companies, military personnel, schools and universities, sports arenas, airlines, cruise lines, border patrol agents, and the like. The composition can be used to encapsulate, contain, and remove a wide variety of harmful substances, preventing secondary exposure to such substances. Non-limiting examples of such substances include narcotics, such as fentanyl, heroin, cocaine, codeine, thebaine, morphine, or percocet; amphetamines; radioactive materials; explosive materials; flammable materials; or biological agents. As an example, fentanyl is commonly shipped in small but lethal quantities on commercial aircraft. In the event that an amount of fentanyl as small as a penny were released, it could kill every person on an airplane. However, a flight attendant armed with the composition could prevent this from happening. Moreover, as the skilled person will recognize, the composition is useful for spraying in an area where the user is unsure as to whether a harmful substance is present or not, as a precaution against accidental exposure to harmful substances.

The composition is useful on a wide variety of surfaces, such as, but not limited to, wood, metal, glass, plastic, concrete, stone, tile, or fabric. Moreover, the composition is easily peelable from non-porous flat or smooth surfaces, does not harm skin, and is not flammable. If a person has a contaminant on their skin, the composition can be directly applied to the skin in order to encapsulate the contaminant and prevent secondary exposure to the contaminant. Once removed by peeling the composition, and under proper safety precautions, the skin may be washed with warm water and a mild detergent.

EXAMPLES

Example I—Formulation

A 6-gallon batch of the composition was made by first mixing 0.53 lbs (0.967 wt %) water, 0.0236 lbs (0.043 wt %) 901 W, 0.04 lbs (0.072 wt %) sodium omadine, 45.67 lbs (83.3 wt %) UCAR 3560, 0.367 lbs (0.669 wt %) AMP, and 1.706 lbs (3.11 wt %) UCAR IBT filmer. The UCAR 3560, AMP, and UCAR IBT filmer were each mixed as added for 5 to 10 minutes before adding the next ingredient. This is because the material coagulates resin in particles if not blended as added. Then, each of the following five materials were pre-mixed before adding to the above mixture: 3.94 lbs (7.18 wt %) water, 0.105 lbs (0.191 wt %) orange dye, 0.262 lbs (0.477 wt %) DC 193, 1.916 lbs (3.49 wt %) propylene glycol, and 0.262 lbs (0.477 wt %) lecithin. The dye was pre-mixed into the water, and mixed fully until dissolved, before adding. The dye is difficult to disperse in the material completely, and so it was mixed completely. The resulting composition had a viscosity of about 85-88 cP. The composition was charged into a bladder-type aerosol can, and the resulting spray produced a strippable coating which could encapsulate powder substances.

Example II—Encapsulation of Fentanyl

Approximately 10 milligrams of fentanyl was encapsulated in a composition as described herein, referred to as "S1" or "BLOC Spray" in this example, and allowed to cure. Approximately 10 milligrams of fentanyl was placed on a glass substrate and evenly spread across the surface of the substrate. S1 was evenly sprayed across the fentanyl/substrate until coated. The polymeric material was then allowed to dry until firm to the touch (approximately 60 minutes). The fentanyl encapsulated in the polymeric material was then removed from the glass substrate by methanol extraction. Approximately 10 grams of methanol were added to the 16 mL vial, the vial was vortexed for several seconds to ensure homogeneity, and then the vial was placed on a wrist action shaker for 2 hours to extract any fentanyl into the methanol. The methanol extract was then diluted with methanol and analyzed by Gas Chromatography/Mass Spectrometry (GC/MS). The analysis was conducted on a non-porous surface (i.e., glass) in duplicate. Additionally, approximately 10 milligrams of fentanyl was dissolved in methanol in a vial, diluted with emthanol, and analyzed by GC/MS to assess the difference in the response of encapsulated vs. non-encapsulated fentanyl. Furthermore, a glass substrate without fentanyl was taken through the sample preparation procedure to provide a "method blank" for any non-fentanyl peaks that may be observed by GC/MS.

Figure 3:
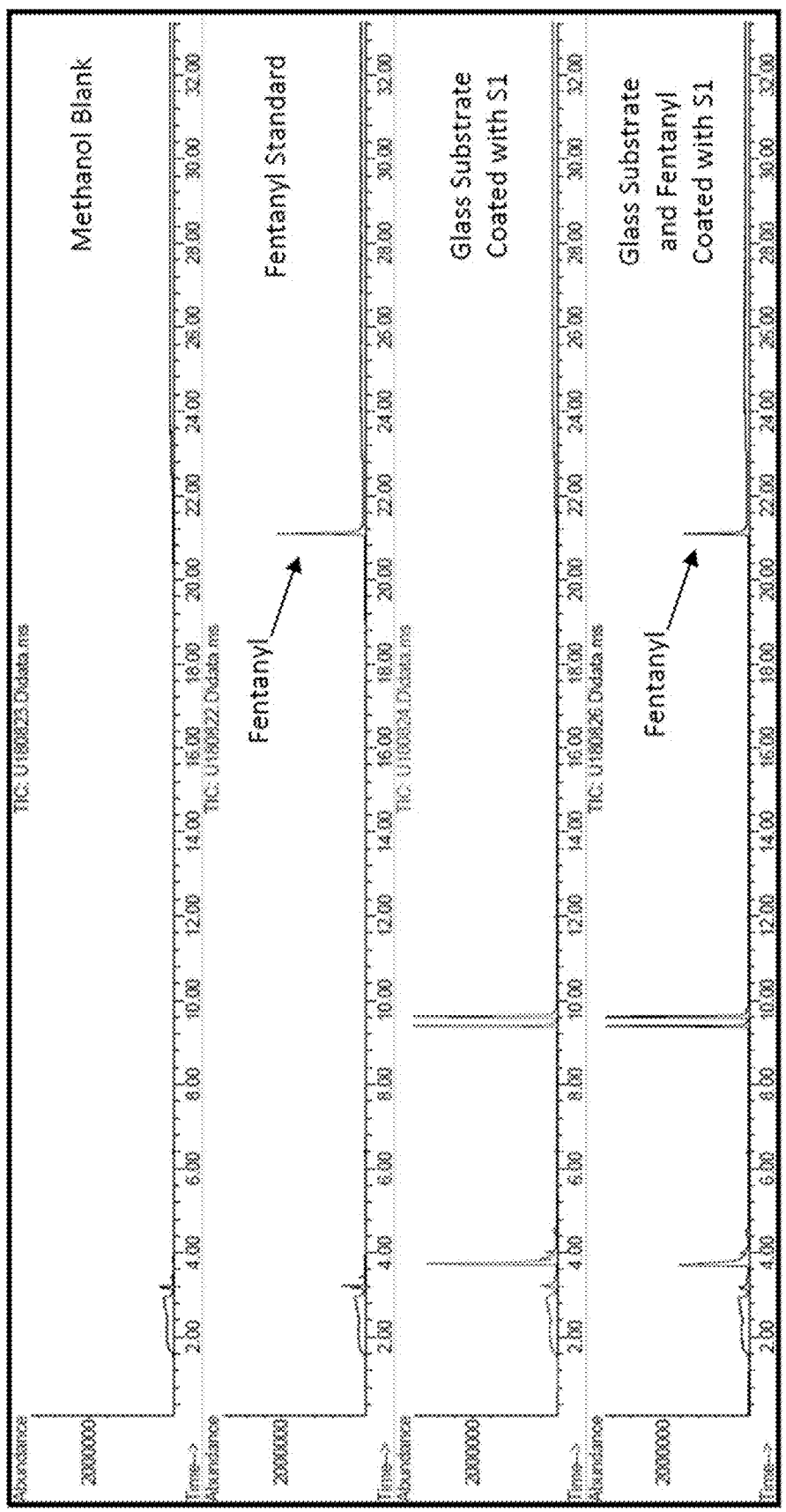
FIG. 3: Testing results (namely, a representative TIC of methanol blank, fentanyl standard, glass substrate coated with a composition herein, and glass substrate and fentanyl coated with the composition) showing that a composition described herein can encapsulate fentanyl.

Tables 1-2, below, summarize the results of the GC/MS analysis of fentanyl encapsulation. A fentanyl response was detected in both encapsulated preparations, as well as the methanol diluted sample. Fentanyl was not detected in the "method blank" preparation. FIG. 3 shows a representative Total Ion Chromatogram (TIC) from the GC/MS analysis of S1 on a glass substrate.

TABLE 1

Summary of results

| PREPARATION TECHNIQUE | FENTANYL RESULTS BY GC/MS |
|---|---|
| ~10 mg of fentanyl dissolved in methanol | detected |
| BLOC Spray applied to clean glass slide and extracted with methanol | not detected |
| BLOC Spray appled to ~10 mg of fentanyl extracted with methanol | detected (prep 1) detected (prep 2) |

TABLE 2

Fentanyl response observed in encapsulated and non-encapsulated samples via GC/MS analysis

| SAMPLE DESCRIPTION (SAMPLE NUMBER) | FENTANYL RESPONSE (AREA COUNTS) | % RECOVERY OF FENTANYL RESPONSE |
|---|---|---|
| Coated with "BLOC Spray" (S1) | 39,430,122 (prep 1) 25,951,287 (prep 2) | 72% 47% |
| "Method Blank" | N/A | N/A |
| Non-encapsulated Fentanyl | 53,773,578 | N/A |

Example III—Encapsulation of Vanillin

To confirm that a powder can be encapsulated on different substrates, and stays encapsulated in the composition described herein, approximately one gram of vanillin was encapsulated from glass and denim substrates in the composition, referred to as "BLOC Spray" or "S1", and the composition was allowed to cure. The cured material was then wiped with an absorbent pad, and the pad was analyzed by Solid Phase Microextraction Gas Chromatography/Mass Spectrometry (SPME-GC/MS) to assess encapsulation efficacy. Additionally, approximately one gram of non-encapsulated vanillin was swabbed with an absorbent pad and analyzed by SPME-GC/MS to assess the difference in the response of encapsulated vs. non-encapsulated vanillin. The analysis was conducted on two substrates, glass and denim, to assess encapsulation on a nonporous surface (i.e., glass) and porous surface (i.e., denim). Table 3 below summarizes these results.

TABLE 3

Summary of results

| SAMPLE DESCRIPTION (SAMPLE NUMBER) | SUBSTRATE | DECREASE IN VANILLIN RESPONSE |
|---|---|---|
| BLOC Spray (S1) | Glass | 98.2% |
|  | Denim | 98.6% |

Approximately one gram of vanillin was placed on glass and denim substrates and evenly spread across the surface of the substrate. S1 was sprayed across the vanillin/substrate until coated. The polymeric material was then allowed to dry until firm to the touch (approximately 45 minutes). An absorbent pad (Pig® Absorbent Mat Pad) was pressed against the cured polymeric material to collect any vanillin which was not encapsulated by S1, and then the pad was placed in a headspace vial. The headspace vials were shaken at room temperature for 30 minutes to release any vanillin collected on the pad into the headspace. The headspace vials were then analyzed by SPME-GC/MS for the presence of vanillin Vanillin-free substrates were taken through the same analytical procedure to serve as blanks. Approximately one gram of vanillin was also swabbed with an absorbent pad, and the pad was placed in a headspace vial, shaken for 30 minutes, and analyzed by SPME-GC/MS to compare against the encapsulated vanillin samples. The non-encapsulated vanillin standard was prepared on both glass and denim substrates.

Figure 4A:
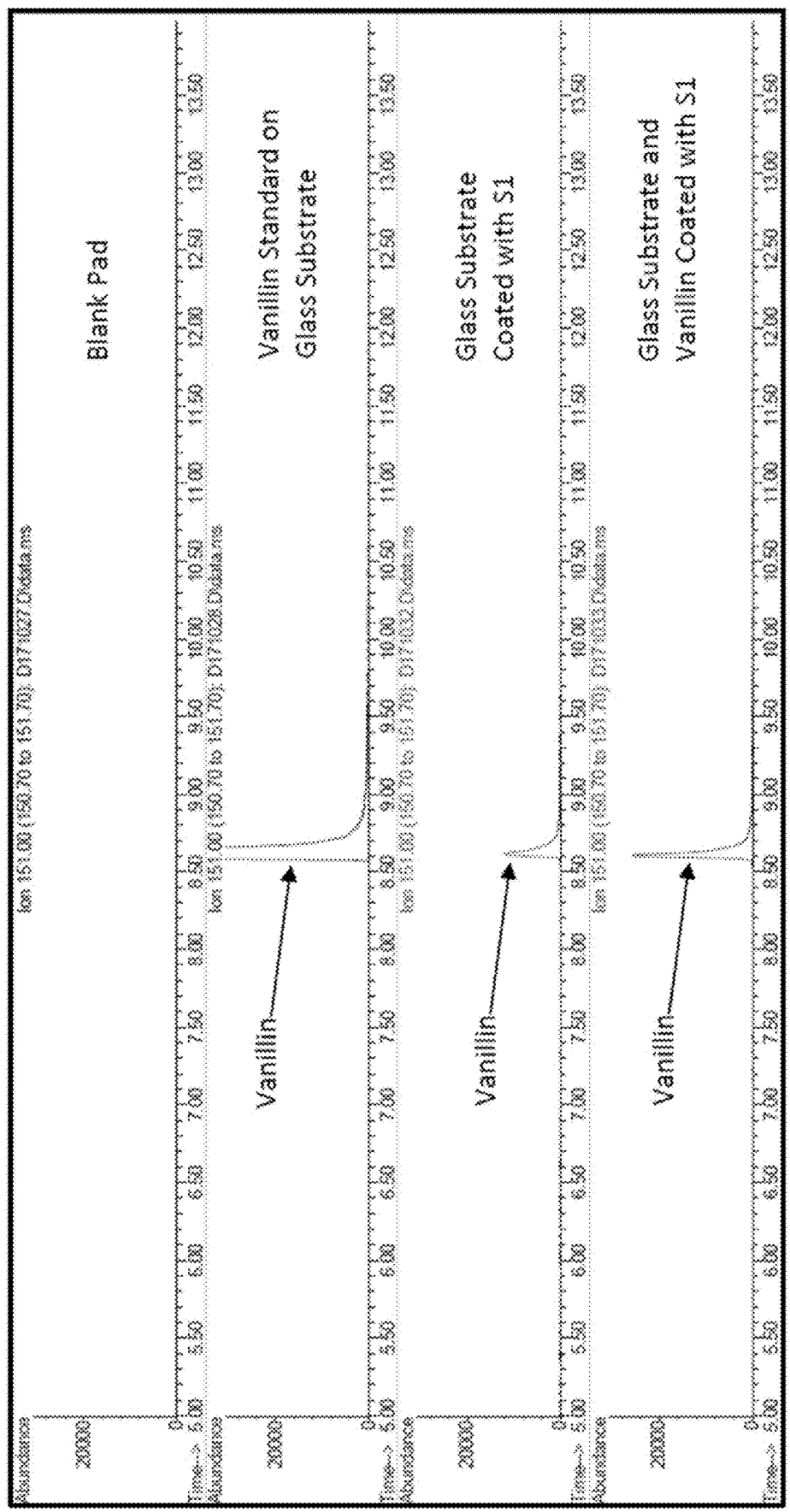
FIGS. 4A-4B: Representative EICs of blank pad, vanillin standard on glass substrate, glass substrate coated with a composition herein, and glass substrate and vanillin coated with the composition herein (FIG. 4A), and blank pad, vanillin standard on denim substrate, denim substrate coated with the composition, and denim substrate and vanillin coated with the composition (FIG. 4B).
Figure 4B:
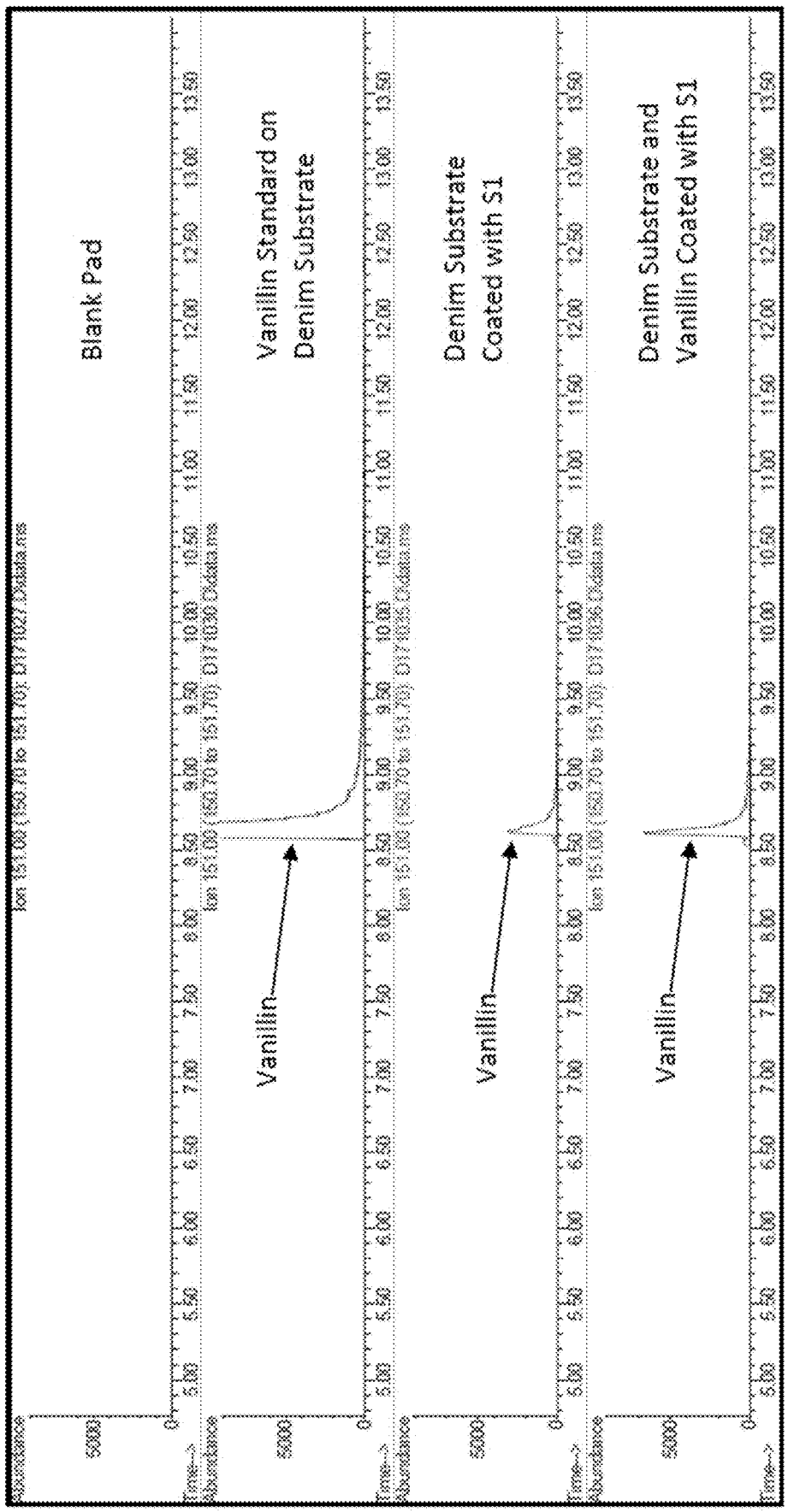

A vanillin response was detected in S1 on both glass and denim substrates. The results indicate that when S1 was applied, the vanillin response observed was reduced compared to the non-encapsulated vanillin standard (FIGS. 4A-4B). Additionally, a vanillin response was detected in the vanillin-free substrate samples, though at a smaller area count than their vanillin-encapsulated counterparts. The area response detected in the vanillin-free substrates was subtracted from their respective vanillin encapsulated area counts, and the subtracted response was compared to the non-encapsulated vanillin standard. Due to the small vanillin response observed in encapsulated samples, Extracted Ion Chromatograms (EIC) were used to extract an ion (ion 151 m/z) specific to vanillin's response and accurately determine the decrease in vanillin response. Table 4 below summarizes the results of the vanillin encapsulation by S1. FIGS. 4A-4B contain representative EICs from the SPME-GC/MS analysis of S1 on glass and denim substrates, respectively. This example demonstrates that the composition can be used to encapsulate and remove substances from a variety of substrates, including from clothing.

TABLE 4

Summary of vanillin response observed in encapsulated and non-encapsulated samples via SPME-GC/MS analysis

| SAMPLE DESCRIPTION | SUB-STRATE | VANILLIN RESPONSE (AREA COUNTS) | % DECREASE IN VANILLIN RESPONSE |
|---|---|---|---|
| Coated With "BLOC Spray" (S1) | Glass | 364941 | 98.2% |
|  | Denim | 127854 | 98.6% |
| Uncoated Vanillin | Glass | 20722756 | N/A |
|  | Denim | 9072432 | N/A |

Certain embodiments of the compositions, systems, devices, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. A composition comprising a latex polymer component and an anti-freeze component, wherein the composition has a viscosity low enough to facilitate delivery of the composition via aerosol spray or misting agent, and the composition is capable of being applied to a surface to create a strippable coating on the surface;
    wherein the composition has a boiling point of about 212° F., a freezing point of about 27° F., a specific gravity of about 1.0-1.2, a density of about 9.25 lbs/gal, and a pH of from about 6.5 to about 8.0; and
    wherein the anti-freeze component comprises propylene glycol.

2. The composition of claim 1, wherein the composition is in the form of an aerosol spray or a misting agent.

3. The composition of claim 1, further comprising a dye.

4. The composition of claim 1, wherein the latex polymer component comprises a butyl acrylate polymer or a butyl acrylate/vinyl acetate copolymer.

5. The composition of claim 1, wherein the composition further comprises:
    an antimicrobial agent;
    a coalescing aid;
    a defoamer;
    a dispersant;
    a surfactant; and
    a homogenization aid.

6. The composition of claim 5, wherein the coalescing aid comprises 2,2,4-trimethyl-1,3-pentanediol monoisobutyrate.

7. The composition of claim 5, wherein the antimicrobial agent comprises sodium omadine.

8. The composition of claim 5, wherein the defoamer comprises a polyether siloxane copolymer containing fumed silica.

9. The composition of claim 5, wherein the surfactant is a silicone surfactant.

10. The composition of claim 5, wherein the dispersant comprises 2-amino-2-methyl-1-propanol.

11. The composition of claim 5, wherein the homogenization aid comprises lecithin.

12. A composition comprising a latex polymer component and an anti-freeze component, wherein the composition has a viscosity low enough to facilitate delivery of the composition via aerosol spray or misting agent, and the composition is capable of being applied to a surface to create a strippable coating on the surface;
    wherein the composition further comprises:
        a defoamer in an amount of about 0.043 wt %;
        an antimicrobial agent in an amount of about 0.072 wt %;

a latex polymer component in an amount of about 83.3 wt %;
a dispersant in an amount of about 0.669 wt %;
a coalescing aid in an amount of about 3.11 wt %;
a dye in an amount of about 0.191 wt %;
a surfactant in an amount of about 0.477 wt %;
an anti-freeze component in an amount of about 3.49 wt %;
a homogenization aid in an amount of about 0.477 wt %; and
water in an amount of about 8.14 wt %.

13. The composition of claim 12, wherein the defoamer comprises a polyether siloxane copolymer containing fumed silica, the antimicrobial agent comprises sodium omadine, the dispersant comprises 2-amino-2-methyl-1-propanol, the dye comprises orange dye, the anti-freeze component comprises propylene glycol, and the homogenization aid comprises lecithin.

14. A composition comprising a latex polymer component and an anti-freeze component, wherein the composition has a viscosity low enough to facilitate delivery of the composition via aerosol spray or misting agent, and the composition is capable of being applied to a surface to create a strippable coating on the surface;
wherein the composition comprises:
water in an amount ranging from about 35 wt % to about 40 wt %;
butyl acrylate polymer in an amount of less than 51 wt %;
poly(oxy-1,2-ethanediyl)-alpha-(4-nonylphenyl)-omega-hydroxyl-vinyl acetate in an amount of less than 2 wt %;
vinyl acetate in an amount ranging from about 0.03 wt % to about 0.06 wt %;
propylene glycol in an amount ranging from about 2 wt % to about 3 wt %; and
oxygenated hydrocarbons in an amount ranging from about 2 wt % to about 3 wt %.

15. The composition of claim 14, wherein the composition comprises other additives in an amount ranging from about 1 wt % to about 5 wt %.

16. An aerosol system for applying a coating comprising:
a canister;
a bladder within the canister housing the composition of claim 1; and
a propellant within the canister, wherein the propellant is completely separated from the composition.

17. The aerosol system of claim 16, comprising an actuator with a head having an orifice and being rotatable within a base member between a first position and a second position.

18. The aerosol system of claim 17, wherein in the first position, a lip of the base member blocks the orifice, and in the second position the orifice is not blocked by the lip.

19. A method for preventing exposure to a substance, the method comprising:
spraying a surface having a substance thereon with an aerosol composition to form a strippable coating on the surface and encapsulate the substance in the strippable coating, wherein the aerosol composition comprises a latex polymer component and an anti-freeze component; and
peeling the strippable coating off to remove the substance from the surface.

20. The method of claim 19, wherein the substance comprises a narcotic, an amphetamine, a radioactive material, an explosive material, a flammable material, or a biological agent.

21. The method of claim 19, further comprising analyzing the substance in the strippable coating.

22. The method of claim 19, wherein the surface is wood, metal, glass, plastic, concrete, stone, tile, or fabric.

23. The method of claim 19, wherein the composition forms the strippable coating on the surface in a time of from about 5 minutes to about 15 minutes.

24. The method of claim 19, wherein the composition is sprayed from a system comprising a canister, a bladder within the canister housing the composition, and a propellant within the canister, wherein the propellant is completely separated from the composition.

* * * * *